July 22, 1958  H. W. PURDY  2,844,376
PROBABILITY INDICATOR AND GAME DEVICE
Filed June 30, 1954
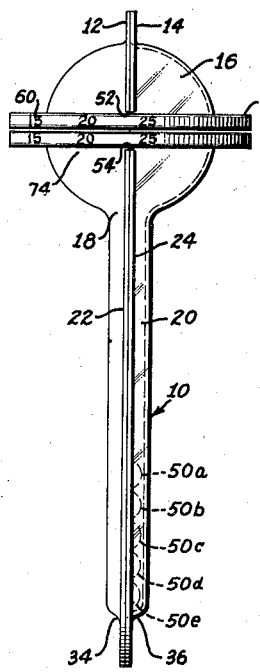
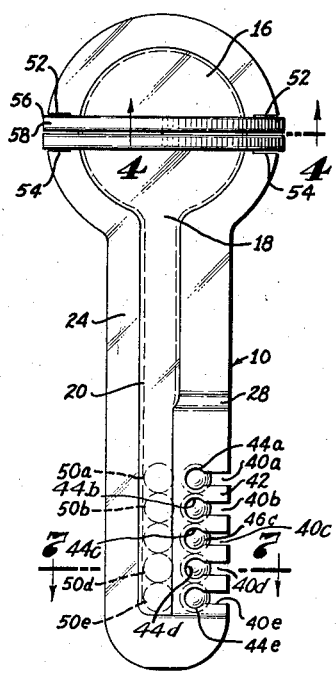
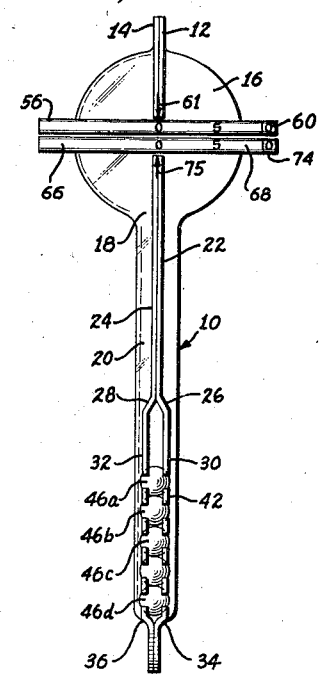
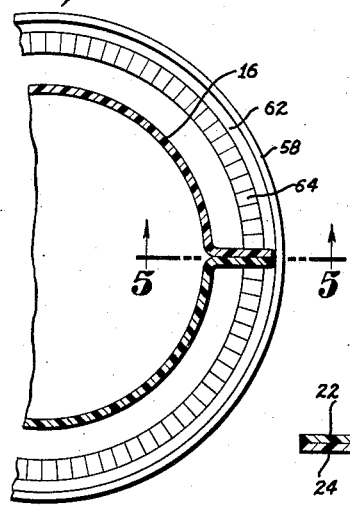
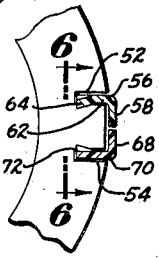
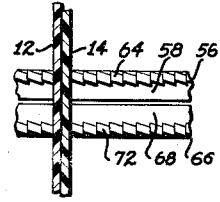
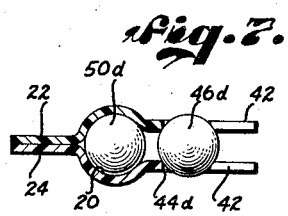
HARRY W. PURDY,
INVENTOR.
BY George J. Smyth
Attorney.

United States Patent Office 2,844,376
Patented July 22, 1958

2,844,376

PROBABILITY INDICATOR AND GAME DEVICE

Harry W. Purdy, Inglewood, Calif.

Application June 30, 1954, Serial No. 440,433

6 Claims. (Cl. 273—144)

This invention relates to probability indicators and more particularly to apparatus for indicating the probability of matching members with different characteristics in a first plurality and members with corresponding characteristics in a second plurality. The invention is also adapted to indicate the varying degrees of extra-sensory perception which different people may have in determining the order in which various events may occur.

During the past quarter of a century, a number of tests have been made to determine the extra-sensory perception of different people. In the tests, a person being tested is separated by a screen or other barrier from a person testing him so that they cannot see each other but can hear each other. The tester then holds up a card having a number or a color or some other suitable characteristic on it and the person being tested tries to identify the characteristic. A score is kept of the number of cards that have been held up for identification and the number of times that the person being tested has identified the characteristic correctly.

Tests similar to those disclosed above have been made on a relatively scientific basis at such testing clinics as Duke University, and considerable effort has been devoted to analyzing the test results from both mathematical and scientific standpoints. It has been found that some people score considerably higher in the tests than other people and that they score considerably higher not for just one day but consistently over a long period of time. A full and scientifically proven explanation of why this occurs has not been advanced as yet.

This invention provides apparatus for facilitating such tests in the future. It also provides apparatus which can be used in the home as a parlor game to prove to guests that extra-sensory perception, in other words, the so-called "sixth sense," actually does exit. The apparatus is also able to indicate approximately how much extra-sensory perception each person has. When used in a slightly different manner, the apparatus is also able to indicate the probability of an occurrence.

The invention includes a holder having a top chamber for mixing a plurality of members such as individually colored balls upon agitation of the holder. A hollow stem extends downwardly from the holder to receive the balls in a vertical column after they have been agitated. The stem is also adapted to hold a second plurality of balls having color characteristics corresponding to the balls in the first plurality. The balls in the second plurality are removable from the stem so that they can be arranged in any combination desired in anticipation of the manner in which the balls in the first plurality will arrange themselves in the stem.

Manually actuatable means are also included in the invention for providing an indication or count as to the number of times that vertical columns are produced by the first balls and the number of correlations between individual balls in the first and second pluralities. In this way, the probability of an occurrence or the extra-sensory perception of an individual can be determined even while a game is being played.

An object of this invention is to provide apparatus for indicating the probability of the occurrence of an event when a number of different possibilities are presented.

Another object is to provide apparatus of the above character for indicating the extra-sensory perception, or "sixth sense," of an individual in anticipating the occurrence of different sets of facts.

A further object is to provide apparatus of the above character which can be used as an intriguing parlor game even while it offers possibilities of education.

Still another object is to provide apparatus of the above character which is light, inexpensive and durable and in which none of the parts can be lost or misplaced as in other parlor games.

A still further object is to provide apparatus of the above character which can offer fun to people of all ages, from pre-school children to mature men and women, and to people of all educational backgrounds.

Other objects and advantages will be apparent from a detailed description of the invention and from the appended drawings and claims.

In the drawings:

Figure 1 is a front elevational view of apparatus constituting one embodiment of the invention;

Figure 2 is a side elevational view of the apparatus shown in Figure 1 as seen from the right side of Figure 1 and illustrates in further detail the construction of certain features shown in Figure 1;

Figure 3 is a side elevational view of the apparatus shown in Figure 1 as seen from the left side of Figure 1;

Figure 4 is an enlarged, fragmentary sectional view substantially on the line 4—4 of Figure 1 and illustrates in further detail certain components shown in the previous figures;

Figure 5 is an enlarged, fragmentary sectional view substantially on the line 5—5 of Figure 4, the components shown in Figure 5 being even further enlarged than the corresponding components shown in Figure 4;

Figure 6 is an enlarged, fragmentary sectional view substantially on the line 6—6 of Figure 5, the components shown in Figure 6 having approximately the same enlargement as the corresponding components shown in Figure 5; and Figure 7 is an enlarged sectional view substantially on the line 7—7 of Figure 1.

The device or apparatus of the present invention comprises, in the illustrated embodiment thereof, a holder or body member 10 formed from two shell portions 12 and 14, which are made from a suitable material such as polystyrene. In the now preferred embodiment, the shell portion 14 is transparent while the shell portion 12 is opaque. The opacity of the shell portion 12 may be inherent in the material used for the portion or it may be applied as a coating to the portion by any suitable means.

As will be seen in Figures 1 to 3, inclusive, the shell portions 12 and 14 flare outwardly at their top end to form, when the shell portions are assembled, a hollow bulbous portion or spherical chamber 16. The chamber 16 has an opening 18 at its bottom end for communication with a vertical column or tubular portion 20 formed by grooves provided in the portions 12 and 14. The column 20 may have a substantially cylindrical shape with a relatively small diameter in comparison to its axial length.

The shell portions 12 and 14, respectively, have flanges 22 and 24 which extend around substantially the entire peripheries of the shell portions. When the two shell portions 12 and 14 are pressed against each other, the flanges 22 and 24 lie in flush relationship to each other along most of their length. The flanges 22 and 24 are sealed together along their surfaces of contact as by the application of heat or a suitable cement to form the chamber 16 and the column 20 within the shell portions.

The right sides of the flange portions 22 and 24, as seen in Figures 1 to 3 inclusive, are wider than the left sides of the flanges. At an intermediate position along their right sides, the flanges are bent back or separated as at 26 and 28 to form support portions 30 and 32. The support portions 30 and 32 extend downwardly in spaced parallel relationship to each other to a position at the bottom of the flanges. The support portions 30 and 32 are then respectively bent inwardly as at 34 and 36 such that the flanges 22 and 24 are again in abutting relationship to each other.

A plurality of spaced slots 40a, 40b, 40c, etc., are provided in the support portions 24 and 26 of the flanges which define clamping portions 42 or fingers therebetween. For purposes of illustration, five slots are shown in the drawings. The slots 40a, 40b, 40c, etc., are sufficiently close to one another to give the clamping portions 42 springlike characteristics for movement in the vertical and horizontal directions. The slots 40a, 40b, 40c, etc., extend inwardly from the marginal edges of the support portions 30 and 32 to an intermediate position in the support portions. At their inner extremities, the slots 40a, 40b, 40c are enlarged to define socket elements 44a, 44b, 44c, etc.

A plurality of spherical members, such as small balls, are adapted to be securely held within the sockets 44a, 44b, 44c, etc., but in removable relationship to the sockets. Five balls 46 are shown in the drawings corresponding to the number of slots 40 and the number of sockets 44. Each of the balls 46a, 46b, 46c, etc. have a different color or any other characteristic which will distinguish it from the other balls. The balls 46a, 46b, 46c, etc. correspond in color or other distinguishing characteristics to a plurality of balls 50a, 50b, 50c, etc. carried within the intercommunicating chamber 16 and column 20.

In using the apparatus disclosed above, the object is to horizontally align the balls 50a, 50b, 50c, etc. or as many of the balls 50a, 50b, 50c, etc. with corresponding balls 46a, 46b, 46c, etc. Depending upon the sequence of events, the horizontal alignments indicate the probability of the occurrence of an event or the extra-sensory perception of an individual. When the apparatus is used to indicate the probability of an event, the balls 46a, 46b, 46c, etc. are first arranged in a particular pattern in the sockets 44a, 44b, 44c, corresponding to the pattern in which the person operating the apparatus (hereinafter called "the operator") believes that the balls 50a, 50b, 50c, etc. will align themselves.

The balls 46 are disposed in the sockets 44 by positioning them adjacent the slots 40 and pressing them horizontally towards the sockets 44. Since the clamping members 42 have springlike properties, they yield in vertical and horizontal directions so that the balls 46 can pass into the sockets 44. The balls 46 are retained securely within the sockets because of their size relative to the sockets 44 and because of the spaced disposition of each pair of sockets.

For indications of probability, the balls 46a, 46b, 46c, etc., are arranged in a particular pattern in the sockets 44a, 44b, 44c, etc. before the balls 50a, 50b, 50c, etc. are mixed. The balls 50 are mixed in the chamber 16 by first inverting or tilting the holder 10 so that the balls 50 can move from the column 20 into the chamber 16. The holder 10 is then revolved or otherwise agitated in its tilted or inverted position to produce a considerable movement of the balls 50 within the chamber 16. The balls 50 are able to have a considerable mixing movement within the chamber 16 because of the relatively large diameter of the chamber relative to the diameter of the balls.

After the balls 50 have been well mixed within the chamber 16, the holder 10 is returned to its upright position. This causes the balls 50 to drop through the opening 18 into the column 20. Since the opening 18 and the column 20 have relatively narrow diameters on the order of the ball diameters, only one ball 50 at a time is able to move through the opening, and the balls are able to settle in the column 20. The balls 46 are then arranged in the sockets 44 in a pattern corresponding to that contemplated by the operator as that of the balls 50 in the column 20. This may be accomplished by the operator without his seeing the arrangement of the marbles 50 in the column 20 since the shell 14 is opaque and may be positioned towards the operator.

The sequence of operation disclosed in the previous paragraph has certain advantages when it is desired to determine the extra-sensory perception of the player. The reason is that the player is then trying to determine the sequence of a set of related facts which have already occurred rather than trying to determine the sequence of future facts, the facts in this case being the arrangement of the balls 50.

In order to obtain a good indication of the relative number of correlations which an operator is able to obtain, he may use the apparatus disclosed above a number of times. Each time that he uses the apparatus, if he desires, he may arrange the balls 46 in a particular pattern and attempt to mix the balls 50 so that they will arrange themselves in the column 20 in a pattern corresponding as much as possible to that of the balls 46. Or, he may first arrange the balls 46 and may subsequently mix the balls 50 to get as good a correlation as possible with the balls 46. When an operator uses the apparatus disclosed above, a number of times, he may want to keep a record of the number of such times and of the number of correlations produced in such uses.

To this end the apparatus includes counting or indicating means which may take various forms. In the illustrated embodiment of the present invention, the indicating means includes a pair of aligned slots 52 provided in the flanges 22 and 24 at a position just above the maximum horizontal distance between the extremities of the flanges. The slots 52 extend into the flanges from the periphery of the flanges for a distance somewhat greater than half of the lateral dimension of the flanges and have a relatively narrow vertical dimension. Similarly, a pair of aligned slots 54 are provided in the flanges 22 and 24 at a corresponding distance below the maximum diameters of the flanges 22 and 24. The slots 54 are disposed and dimensioned in a manner similar to the slots 52.

An annular ratchet member 56 made from a suitably resilient material such as polystyrene is supported within the slots 52. The ratchet member 56 has an annular portion 58 with a diameter slightly greater than the maximum distance between the extremities of the flanges 22 and 24. The vertical portion 58 extends integrally downwardly, as viewed in Figures 1 to 3, from the slot 52 and carries a plurality of indications 60 successively numbered at spaced intervals around its periphery.

The numerical indications 60 may be consecutive, for example, 1, 2, 3, etc., if they are disposed relatively close to each other, or they may be multiples such as, 5, 10, 15, etc., if they are spaced further apart. The indications 60 may be painted, etched or otherwise disposed on the vertical portion 58. The position at which the indications 60 are to be read may be determined by providing an indication 61 such as an arrow on the right side of the flange 24 at a position adjacent the slots 52 and 54.

A horizontal portion 62, integral with the vertical portion 58, is supported within the slots 52 at the outer portions of the slots. A plurality of teeth 64 extend inwardly from the horizontal portion 62. The teeth 64 are formed by cuts or slots in a radial direction at spaced intervals. The peripheral distance of each tooth 64 corresponds to the spacing between successive numbers on the vertical portion 58 when the numbers are consecutive.

Otherwise, the peripheral distance occupied by each tooth 64 may be a proportionate fraction of the distance between successive indications 60 on the vertical portion 58 when the indications represent multiples such as 5, 10, 15, etc.

Each of the teeth 64 is tilted or canted to the end that the teeth are inclined relative to the bottom surfaces of the slots 52. In this way, each tooth 64 rides upwardly on the bottom surfaces of the slots 52 upon its movement in a counterclockwise direction as seen in Figure 4. Because of their inclination, however, the teeth 64 cannot normally move in a clockwise direction as seen in Figure 4.

In like manner, an annular ratchet member 66 is supported within the slots 54. The ratchet member 66 has a vertical portion 68, a horizontal portion 70 and a plurality of teeth 72 extending radially inwardly from the horizontal portion 70 in integral relationship to the horizontal portion. The ratchet member 66 differs from the member 56 in that the vertical portion 68 extends upwardly and the teeth 70 contact the upper surface of the slot 54. A plurality of numerical indications 74 are disposed at spaced intervals around the periphery of the vertical portion 68. An index means, such as an arrow 75, coacts with the indications 74. The indications 74 correspond to the indications 60 on the ratchet member 56 but represent a somewhat different value, as will be disclosed in detail hereinafter.

It should be appreciated that numerical indications corresponding to the indications 60 can be disposed on the shell portions 12 and 14 just above the ratchet member 56 instead of being disposed on the vertical portion 58 of the ratchet member. Similarly, numerical indications corresponding to the indications 74 can be provided on the shell portions 12 and 14 just below the ratchet member 66 in substitution for the indications on the ratchet member. When the indications are disposed on the shell portions 12 and 14, index means, such as arrows, may be provided on the ratchet members 56 and 66 so that an instantaneous determination can be made of the positions in the scales at which readings are to be made.

The operator may keep a record of the number of times that he uses the apparatus constituting this invention by advancing the ratchet member 56 a corresponding angular distance in a counter-clockwise direction. For example, the operator may advance the ratchet member 56 through an arc equivalent to one of the teeth 64 every time that he has mixed the balls 50 in the chamber 16 and produced a vertical alignment of the balls in the column 20 in a particular pattern. He may obtain a reading on the ratchet member 56 by reading the indications 60 on the vertical portion 58 adjacent to or nearest to the index 61 (Figure 2) on the flange 16.

Similarly, the operator may keep a record of the total number of correlations in a plurality of plays by producing an advancement of the ratchet member 66 through an arc equivalent to one of the teeth 72 for each correlation made. He may obtain a determination of the total number of correlations made at any instant by reading the indications 74 on the vertical portion 68 adjacent the index or arrow 75.

The apparatus disclosed above has several important advantages. It provides an indication as to the probability of occurrence of a given set of facts when it is used in a first particular fashion. When it is used in a second particular fashion, it indicates the extra-sensory perception, or "sixth sense," which a person has in determining the order of occurrence of a given set of facts. The apparatus provides these educational values and at the same time offers an opportunity for enjoyment by a single person or a group of people who may have gathered in a home for an evening's entertainment. The apparatus is just as fascinating to children as it is to mature men and women and is equally fascinating to people of all educational backgrounds and interests.

Although the now preferred embodiments of the present invention have been shown and described herein, it is to be understood that the invention is not to be limited thereto, for it is susceptible to changes in form and detail within the scope of the appended claims.

I claim:

1. Apparatus for determining probability by indicating the correlation between a first plurality of members having distinguishable characteristics and a second plurality of members having characteristics corresponding to the members in the first plurality, including: first and second shell portions shaped to provide a chamber for facilitating the mixing of the first members and to provide a column for receiving the first members after their mixing; a flange on each of the first and second shell portions for providing for the fixed positioning one shell portion relative to the other; the flanges being shaped at a position adjacent the column to receive the members in the second plurality in removable relationship to provide for a disposition of the members in any particular pattern and for an alignment between members in the first and second pluralities; there being slots in the flanges at positions adjacent the chamber; and ratchet means having a plurality of teeth, the ratchet means being supported within the slots for movement of the teeth in a particular direction through the slots to provide an indication of the number of columns produced by the first members and the number of correlations between the first and second members resulting from the production of such columns.

2. Apparatus for determining probability by indicating the correlation between a first plurality of members having distinguishable characteristics and a second plurality of members having characteristics corresponding to the members in the first plurality, including: a holder; means in the holder for defining a chamber for mixing the members in the first plurality and for defining a column for receiving the members after their mixing; flange portions extending around the periphery of the holder; means in the flange portions for receiving the members in the second plurality in removable relationship to provide for a variable columnar arrangement of the members in adjacent positioning to the columnar arrangement of the first members; a first ratchet member supported by the flanges in rotatable relationship to the flanges to provide an indication of the number of times that the first members become arranged in columns; and a second ratchet member supported by the flanges in rotatable relationship to the flanges to provide an indication of the number of times that correlations are produced between corresponding members in the first and second pluralities.

3. Apparatus in accordance with claim 1 in which one ratchet means is disposed in a first pair of slots in the flanges to provide an indication of the number of columns produced by the first members and in which a second ratchet means is disposed in a second pair of slots in the flanges to provide an indication of the number of correlations between the first and second members resulting from the production of such columns.

4. Apparatus for determining probability by indicating the correlation between a first plurality of members having distinguishable characteristics and a second plurality of members having characteristics corresponding to the members in the first plurality, including: a holder; means in the holder for defining a chamber for mixing the members in the first plurality and for defining a column for receiving the members after their mixing; flange portions extending around the periphery of the holder; means in the flange portions for receiving the members in the second plurality in removable relationship to provide for a variable columnar arrangement of the members in adjacent positioning to the columnar arrangement of the first members; there being a plurality of slots in the flanges; a first ratchet member supported by particular slots in the plurality and having a plurality of teeth for movement within the slots to provide an indication of the number of times that the first members become arranged in columns in accordance with the number of teeth moved through the slots; and a second ratchet member supported by particular slots in the plurality and having a plurality of teeth for movement within the slots to provide an indication of the number of times that correlations are produced between corresponding members in the first and second pluralities in accordance with the number of teeth moved through the slots.

5. Apparatus in accordance with claim 1 in which each tooth in the ratchet means is inclined at an angle in a peripheral direction for contact with particular surfaces in its associated slots to retain the ratchet means in fixed positioning relative to the flanges until the ratchet means are moved through a peripheral distance equivalent to at least one tooth to vary the indications provided by the ratchet means.

6. A device for determining probability, comprising: a body member including a hollow, enlarged bulbous portion and a depending tubular portion forming a passage leading from said bulbous portion, at least the free end of said tubular portion being formed of a transparent wall element; a first plurality of balls having distinguishable characteristics enclosed within said body member and of such a size relative to the size of said passage as to be seriately movable from an accumulated group in said bulbous portion into a linearly arranged group in the passage of said tubular portion at the free end thereof when said device is disposed with the tubular portion vertically depending from said bulbous portion whereby said balls are visible through said transparent wall section; a second plurality of like balls having characteristics corresponding to the balls in the first plurality; and a series of linearly arranged socket members carried by said tubular portion for removably mounting each of the balls of said second plurality in a selected linear arrangement relative to one another adjacent the transparent wall section of said tubular portion, whereby a visual determination of the correlation between corresponding members in the first and second pluralities can be made.

References Cited in the file of this patent

UNITED STATES PATENTS

| | | |
|---|---|---|
| 174,992 | Whitelaw | Mar. 21, 1876 |
| 526,946 | Schleininger | Oct. 2, 1894 |
| 624,172 | Cahnbley | May 2, 1899 |
| 2,665,915 | Steig | Jan. 12, 1954 |